United States Patent
Nolte et al.

(10) Patent No.: US 10,479,227 B2
(45) Date of Patent: Nov. 19, 2019

(54) SYSTEMS AND METHODS FOR CONTROLLING AUTOMOTIVE SEAT ADJUSTMENTS USING ELECTROMAGNETIC RAIL TECHNOLOGY

(71) Applicant: GM GLOBAL TECHNOLOGY OPERATIONS LLC, Detroit, MI (US)

(72) Inventors: Jason J. Nolte, Wixom, MI (US); Chao Zhang, Warren, MI (US); Lisa A. Fallon, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 247 days.

(21) Appl. No.: 15/645,336

(22) Filed: Jul. 10, 2017

(65) Prior Publication Data

US 2019/0009694 A1   Jan. 10, 2019

(51) Int. Cl.
| | | |
|---|---|---|
| *B60N 2/02* | (2006.01) | |
| *B60N 2/427* | (2006.01) | |
| *B60N 2/07* | (2006.01) | |
| *B60N 2/08* | (2006.01) | |

(52) U.S. Cl.
CPC ......... *B60N 2/0244* (2013.01); *B60N 2/0715* (2013.01); *B60N 2/08* (2013.01); *B60N 2/4279* (2013.01); *B60N 2002/0272* (2013.01)

(58) Field of Classification Search
CPC ...... B60N 2/0244; B60N 2/08; B60N 2/4279; B60N 2/0715; B60N 2002/0272
See application file for complete search history.

(56) References Cited

U.S. PATENT DOCUMENTS

| | | | | |
|---|---|---|---|---|
| 5,344,204 A | * | 9/1994 | Liu | B60N 2/4221 296/68.1 |
| 5,798,582 A | * | 8/1998 | Neff | H02K 41/0356 29/834 |
| 6,055,473 A | * | 4/2000 | Zwolinski | B60N 2/002 701/49 |
| 6,078,854 A | * | 6/2000 | Breed | B60N 2/002 701/49 |
| 6,170,865 B1 | * | 1/2001 | Barron | B60N 2/0276 280/735 |
| 2008/0083346 A1 | * | 4/2008 | Fiske | B60L 13/003 104/283 |
| 2011/0079681 A1 | * | 4/2011 | Honnorat | B64D 11/0689 244/122 R |
| 2014/0265479 A1 | * | 9/2014 | Bennett | B60N 2/919 297/217.4 |
| 2016/0101710 A1 | * | 4/2016 | Bonk | B60N 2/0252 297/217.2 |

* cited by examiner

*Primary Examiner* — Mary Cheung
(74) *Attorney, Agent, or Firm* — Lorenz & Kopf, LLP

(57) ABSTRACT

A method for adjusting a vehicle seat onboard a vehicle is provided. The method obtains vehicle status data, by a processor communicatively coupled to a plurality of sensors onboard the vehicle; detects a current actuation state of the vehicle seat based on the vehicle status data, by the processor, wherein the current actuation state comprises at least one of a user input actuation state and an emergency actuation state; calculates seat adjustments, by the processor, based on the current actuation state; and actuates the vehicle seat based on the seat adjustments, via an electromagnetic vehicle seat rail device communicatively coupled to the processor.

18 Claims, 5 Drawing Sheets

SYSTEMS AND METHODS FOR CONTROLLING AUTOMOTIVE SEAT ADJUSTMENTS USING ELECTROMAGNETIC RAIL TECHNOLOGY

TECHNICAL FIELD

Embodiments of the subject matter described herein relate generally to automobile seat adjustment. More particularly, embodiments of the subject matter relate to the use of electromagnetic rail technology to perform automobile seat adjustment.

BACKGROUND

Automobile seats are generally adjustable in response to user input. Vehicle seat adjustment may be performed by a user as a manual operation, and some vehicle seat systems are set up with a battery-powered automatic control for seat adjustment. Conventional rotary motors are generally used for seat actuation, and typical operation invokes noisy, "toothy" movements in the gear track. Additionally, rotary motors are characterized by slow movement, thereby introducing delay into the vehicle seat adjustment process.

Accordingly, it is desirable to reduce user discomfort, delay, and noise associated with vehicle seat adjustment. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for adjusting a vehicle seat onboard a vehicle. The method obtains vehicle status data, by a processor communicatively coupled to a plurality of sensors onboard the vehicle; detects a current actuation state of the vehicle seat based on the vehicle status data, by the processor, wherein the current actuation state comprises at least one of a user input actuation state and an emergency actuation state; calculates seat adjustments, by the processor, based on the current actuation state; and actuates the vehicle seat based on the seat adjustments, via an electromagnetic vehicle seat rail device communicatively coupled to the processor.

Some embodiments of the present disclosure provide a system for adjusting a vehicle seat onboard a vehicle. The system includes system memory; a plurality of sensors onboard the vehicle, the plurality of sensors comprising internal vehicle sensors and external vehicle sensors; an electromagnetic vehicle seat rail device, comprising locking mechanisms, friction surfaces, and electromagnetic rail elements; a power source configured to generate electromagnetic forces that cause seat actuation along track rails; and at least one processor communicatively coupled to the system memory, the plurality of vehicle sensors, the electromagnetic vehicle seat rail device, and the power source, the at least one processor configured to: obtain vehicle status data, via the plurality of sensors onboard the vehicle; detect a current actuation state of the vehicle seat based on the vehicle status data, wherein the current actuation state comprises at least one of a user input actuation state and an emergency actuation state; calculate seat adjustments, based on the current actuation state; and actuating the vehicle seat based on the seat adjustments, via the electromagnetic vehicle seat rail device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to system and methods for using linear electromagnetic actuation technology (e.g., electromagnetic rail or linear motors) for variable seat adjustment that eliminates the use of conventional rotary motors for seat actuation. This reduces motor noise as well as the "toothy" movement from running on a gear track. Furthermore, the actuation strategy in this design implies the ability to rapidly adjust the seat position, allowing for the potential relocation and/or repositioning of a passenger sitting in the vehicle seat to reduce potential injury during emergent events, a feat difficult and costly with traditional seat designs without compromising normal seat adjustment or user expectations.

Figure 1:
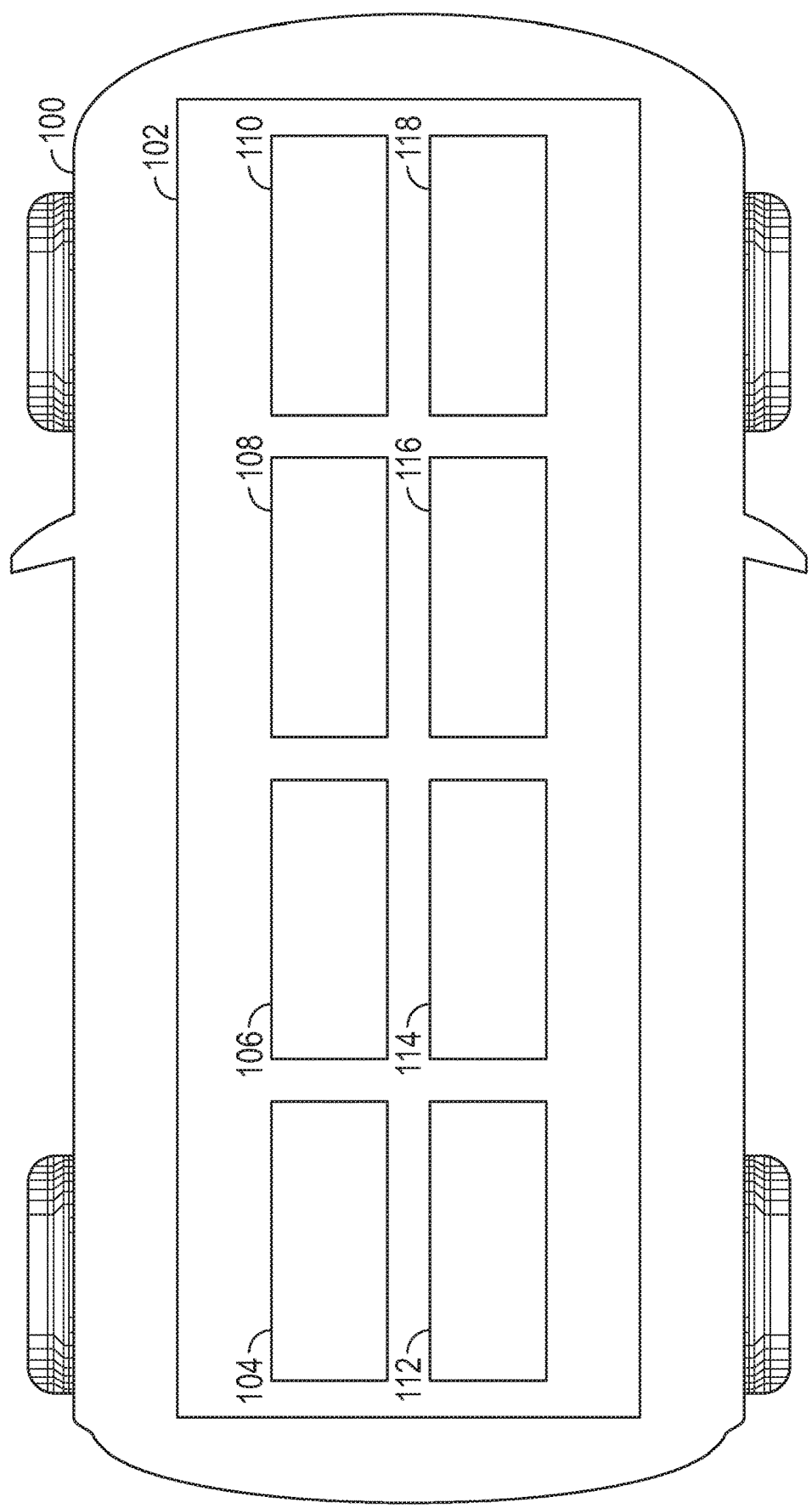
FIG. 1 is a functional block diagram of a linear actuation system for vehicle seats onboard a vehicle, in accordance with the disclosed embodiments.

Turning now to the figures, FIG. 1 is a functional block diagram of a system 102 for the actuation of vehicle seats 112 onboard a vehicle 100, in accordance with the disclosed embodiments. The vehicle 100 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The system 102 for the actuation of vehicle seats 112 generally includes, without limitation: at least one processor 104; system memory 106; a user interface 108; a plurality of vehicle sensors 110; a plurality of vehicle seats 112; electromagnetic seat rail devices 114 for each of the vehicle seats 112; a power source 116; and a seat actuation module 118. These elements and features of the system 102 may be operatively associated with one another, coupled to one another, or otherwise configured to cooperate with one another as needed to support the desired functionality—in particular, actuating vehicle seats 112 onboard the vehicle 100 in response to user input requests and/or detected emergency situations, as described herein. For ease of illustration and clarity, the various physical, electrical, and logical couplings and interconnections for these elements and features are not depicted in FIG. 1. Moreover, it should be appreciated that embodiments of the system 102 will include other elements, modules, and features that cooperate to support the desired functionality. For simplicity, FIG. 1 only depicts certain elements that relate to the vehicle seat actuation techniques described in more detail below.

The at least one processor 104 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 104 may be realized as one or more microprocessors, controllers, microcontrollers, or state machines. Moreover, the at least one processor 104 may be implemented as a combination of computing devices, e.g., a combination of digital signal processors and microprocessors, a plurality of microprocessors, one or more microprocessors in conjunction with a digital signal processor core, or any other such configuration.

The at least one processor 104 is communicatively coupled to the system memory 106. The system memory 106 is configured to store any obtained or generated data associated with vehicle seat actuation. The system memory 106 may be realized using any number of devices, components, or modules, as appropriate to the embodiment. Moreover, the system 102 could include system memory 106 integrated therein and/or a system memory 106 operatively coupled thereto, as appropriate to the particular embodiment. In practice, the system memory 106 could be realized as RAM memory, flash memory, EPROM memory, EEPROM memory, registers, a hard disk, a removable disk, or any other form of storage medium known in the art. In certain embodiments, the system memory 106 includes a hard disk, which may also be used to support functions of the system 102. The system memory 106 can be coupled to the at least one processor 104 such that the at least one processor 104 can read information from, and write information to, the system memory 106. In the alternative, the system memory 106 may be integral to the at least one processor 104. As an example, the at least one processor 104 and the system memory 106 may reside in a suitably designed application-specific integrated circuit (ASIC).

The user interface 108 may include or cooperate with various features to allow a user to interact with the system 102. Accordingly, the user interface 108 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the system 102. For example, the user interface 108 could be manipulated by an operator to request a particular position and/or orientation for one or more of the vehicle seats 112 onboard the vehicle 100, as described herein.

In certain embodiments, the user interface 108 may include or cooperate with various features to allow a user to interact with the system 102 via graphical elements rendered on a display element (not shown). Accordingly, the user interface 108 may initiate the creation, maintenance, and presentation of a graphical user interface (GUI). In certain embodiments, a display element communicatively coupled to the user interface 108 implements touch-sensitive technology for purposes of interacting with the GUI. Thus, a user can manipulate the GUI by moving a cursor symbol rendered on the display element, or by physically interacting with the display element itself for recognition and interpretation, via the user interface 108.

The plurality of vehicle sensors 110 may include internal vehicle sensors and external vehicle sensors configured to obtain current vehicle status data associated with various components and systems of the vehicle 100. Internal vehicle sensors may obtain vehicle status data including, but not limited to: a current seat position, a current seat orientation, presence of a passenger in the vehicle seat, a weight of the passenger in the vehicle seat, vehicle onboard airbag deployment status data, vehicle mass data, system power data, or the like. External vehicle sensors may obtain vehicle status data including, but not limited to: parallel park assist sensor data, front radar data, side blind radar data, wheel alignment data, vehicle acceleration data, vehicle heading data, and vehicle speed data.

The vehicle 100 also includes a plurality of vehicle seats 112 positioned on the interior of the vehicle 100. The plurality of vehicle seats 112 may be implemented using bench seats, bucket seats, folding seats, auxiliary seats, and/or any type of vehicle seat coupled to an electromagnetic seat rail device 114. In exemplary embodiments, each of the plurality of vehicle seats 112 is mechanically coupled to one of the electromagnetic seat rail devices 114, and the electromagnetic seat rail devices 114 are mechanically coupled to the vehicle 100 itself.

Figure 2:
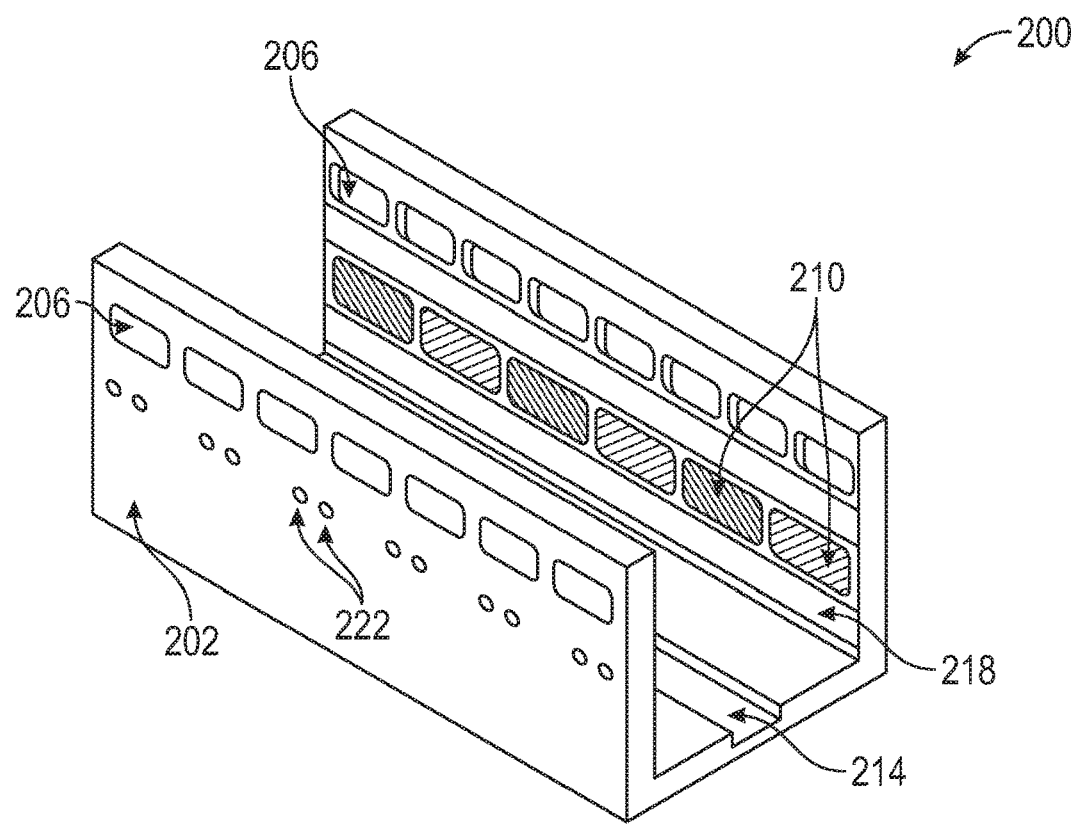
FIG. 2 is a diagram of an electromagnetic vehicle seat rail device, in accordance with the disclosed embodiments.
Figure 2:
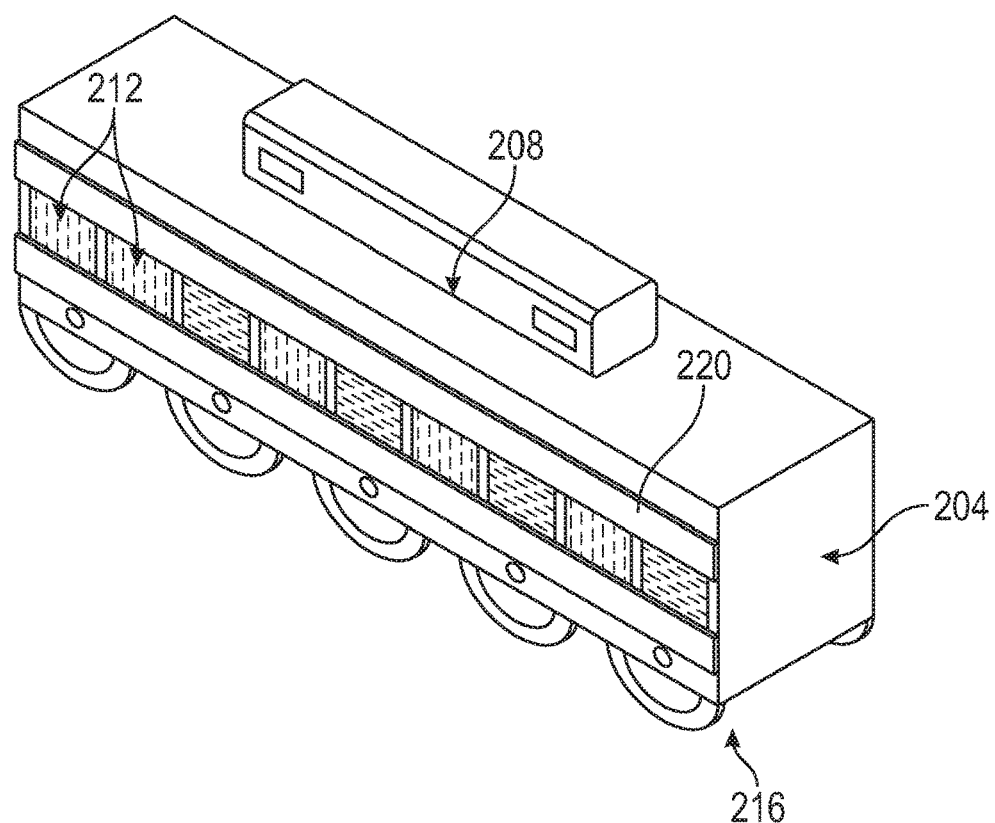

The electromagnetic seat rail devices 114 for each of the vehicle seats 112 are configured to actuate the vehicle seats 112 in response to user-entered requests and in response to a detected emergency condition. The electromagnetic seat rail devices 114 generally include a seat rail positioned in a seat rail channel, as shown in FIG. 2. FIG. 2 is a diagram of an electromagnetic vehicle seat rail device 200, in accordance with the disclosed embodiments. It should be noted that the electromagnetic vehicle seat rail device 200 can be implemented as one of the electromagnetic seat rail devices 114 depicted in FIG. 1. In this regard, the electromagnetic vehicle seat rail device 200 shows certain elements and components of the electromagnetic seat rail devices 114 in more detail. In practice, embodiments of the electromagnetic vehicle seat rail device 200 may include additional or alternative elements and components, as desired for the particular application.

The electromagnetic vehicle seat rail device 200 generally includes a seat rail 204 positioned inside a seat rail channel 202. The seat rail channel 202 is mechanically coupled to the vehicle, and the seat rail 204 is mechanically coupled to the vehicle seat. During typical operation, the vehicle seat is actuated as the seat rail 204 shifts inside the seat rail channel 202. Such actuation of the vehicle seat includes changing a current position of the vehicle seat and a current orientation of the vehicle seat. Traditional permanent magnets 212 and electromagnets 210 are used to create a system of magnetic fields that pull or propel the vehicle seat along the seat rail 204. That is, by constantly alternating the electric current supplied to the electromagnets 210, the polarity of the magnetic coils is changed, as appropriate, to achieve actuation.

Locking mechanisms of the electromagnetic vehicle seat rail device 200 may be implemented as a seat lock actuator 208 of the seat rail 204. As shown, the seat lock actuator 208 may include retractable locking pins or a rotational locking sprocket with electromagnetic pins configured to engage particular seat position lock ports 206 of the seat rail channel 202 when occupying a particular vehicle seat position and/or orientation.

The retractable locking pins may also be implemented using retractable rods. The retractable rods or pins protrude into windows (i.e., seat position lock ports 206) along the seat rail 204, providing retention force for the vehicle seat. The retractable rods or pins are naturally sprung and retract only when magnetic force is applied. A duplicate set of locks (e.g., retractable locking rods or pins) acts as a fail-safe, should one set or rod fail to properly spring into a locked position. In some embodiments, a toothed rotary locking mechanism may be used, which rotates freely when vehicle seat actuation is commanded. In this scenario, the rotary locking mechanism functions like a gear, and maintains a tooth or similar feature in a window, pocket, or seat position lock port 206 at all times. When movement or actuation of the vehicle seat is complete, the rotary motion of the locking mechanism may be suspended by a locking rod or pin, directly or indirectly linked to the seat actuation circuit. The locking mechanism may serve as an end-stop to vehicle seat actuation or a separate track stop may be used. When the locking mechanism is an end-stop, the locking mechanism may be triggered to lock or arrest motion by a secondary switch, position calculation, or measurement algorithm.

The locking mechanisms affix the vehicle seat into a particular position, and prevent actuation when necessary. Locking mechanisms retain a default locking state and unlock when supplied power from a power source (see description of reference 116, FIG. 1) during user-commanded and/or vehicle controls-commanded seat adjustment. Thus, vehicle seat actuation is deactivated during circumstances of critical power failure.

Electromagnetic rail elements of the electromagnetic vehicle seat rail device 200 may include electromagnetic coils and/or a combination of electromagnets and permanent magnets. In the embodiment shown, electromagnets 210 are positioned on the seat rail channel 202 and permanent magnets 212 of alternating polarity are positioned on the seat rail 204. Also, as shown, electromagnetic coil wire ports 222 are positioned on the seat rail channel 202, for purposes of allowing the connection of wires to the electromagnet 210 to power the electromagnet 210. By alternating the current powering each electromagnet 210 (or, alternatively controlling the current at the electromagnet 210 itself via a microcontroller), the electric field can be changed, as appropriate, for seat actuation, as described herein.

Friction surfaces of the electromagnetic vehicle seat rail device 200 may include seat rail rollers 216, nylon rails 220, or the like. In the embodiment shown, seat rail rollers 216 of the seat rail 204 are positioned in a seat rail roller groove 214 of the seat rail channel 202, permitting motion of the seat rail 204 in the seat rail channel 202. Here, the seat rail rollers 216 may be oriented on one or more sides of seat rail 204 or the seat rail channel 202. Further, the seat rail rollers 216 are generally used to control the position of the seat rail 204 and to ensure a smooth motion path of the seat rail 204 in the seat rail channel 202. Also in the embodiment shown, one or more nylon rails 220 of the seat rail 204 are positioned in a nylon rail slide guide 218 of the seat rail channel 202, permitting motion of the seat rail 204 in the seat rail channel 202. Some embodiments of the seat rail 204 may use seat rail rollers 216, some embodiments of the seat rail 204 may use nylon rails 220, and some embodiments of the seat rail 204 may use a combination of seat rail rollers 216 and nylon rails 220.

Returning to FIG. 1, the power source 116 is configured to provide power to the electromagnetic seat rail devices 114 such that the electromagnetic seat rail devices may actuate one or more of the vehicle seats 112. The power source 116 provides power to the electromagnetic seat rail devices 114 to generate electromagnetic forces causing seat actuation along track rails (see FIG. 2). The power source 116 may be implemented using the main car battery or a backup car battery, for slow seat actuation. For faster actuation, a capacitor may be necessary to provide a burst of power. This capacitor could be charged by the aforementioned battery prior to activation. The power source 116 may include a main power source and a back-up power source that is configured to retain a charge such that the back-up power source may be used for an additional power "burst" and/or to accommodate power needs of the electromagnetic seat rail devices 114 when the main power source is unavailable for use. Burst power may be used for rapid adjustment of the electromagnetic seat rail devices 114 in cases of collision and/or airbag deployment onboard the vehicle 100.

The seat actuation module 118 is configured to detect user input requests and emergency vehicle situations, and to initiate actuation of the vehicle seats 112 via the electromagnetic seat rail devices 114. During typical operation, the seat actuation module 118 functions to initiate actuation of one or more of the vehicle seats 112 when a user input request for actuation is received via the user interface 108. In addition to operations performed upon received user request, the seat actuation module 118 also uses vehicle status data (obtained via the vehicle sensors 110) to continuously and dynamically detect emergency vehicle situations. In some embodiments, the emergency vehicle situations may include a potential imminent collision, current airbag deployment, deformation of vehicle body, vehicle entering a body of water, rollover, vehicle fire, or the like. The seat actuation module 118 initiates actuation (via the electromagnetic seat rail devices 114) of one of the vehicle seats 112 such that the vehicle seat, and the occupant of the vehicle seat, is positioned according to the user request or away from circumstances of the detected emergency situation. The primary objective for the seat actuation module 118 is to actuate the seat such that the occupant takes the least amount of damage in each accident scenario (e.g. airbag inflation, collision). In an emergency situation, the secondary goal is to actuate the seat such that it allows the occupant to easily escape the vehicle, or allow emergency crews to easily access the occupant.

Figure 3:
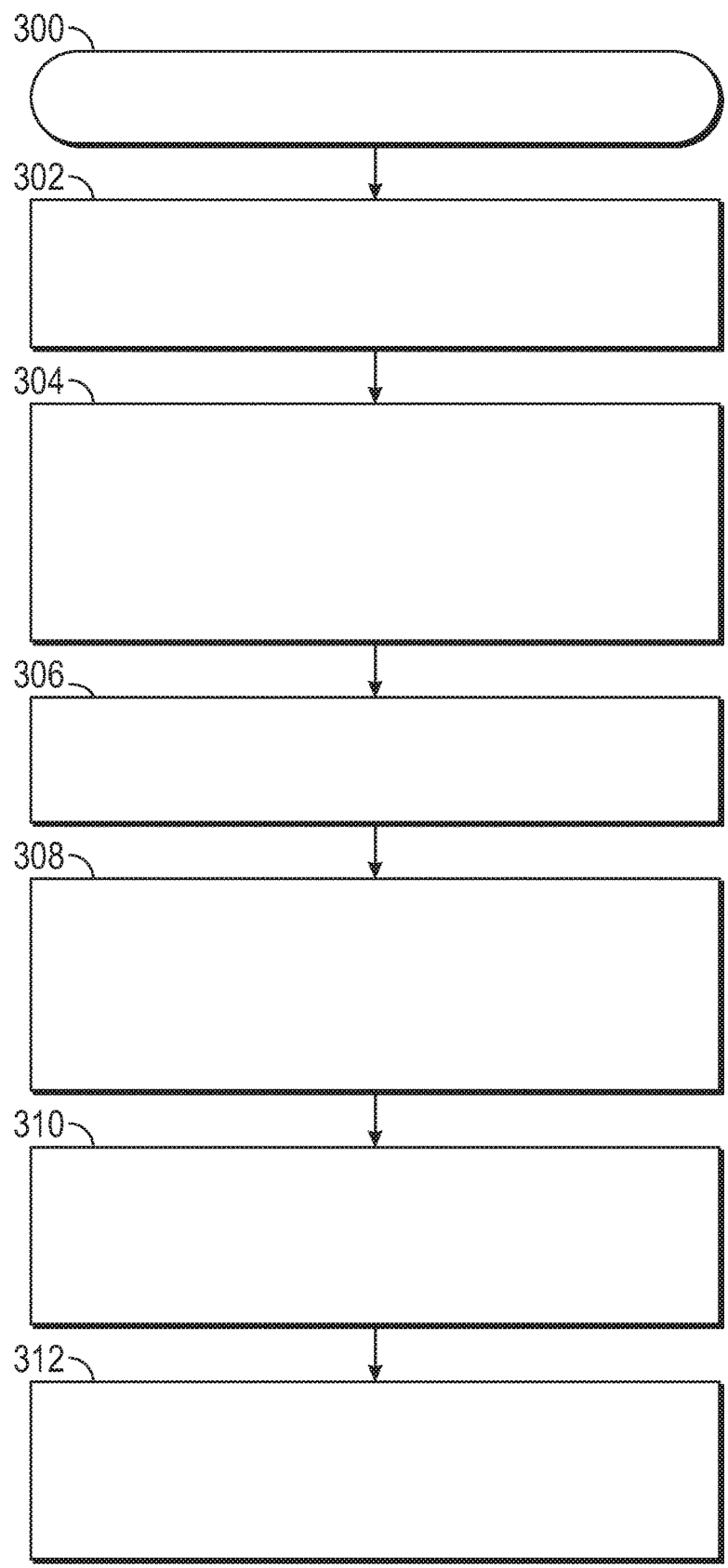
FIG. 3 is a flow chart that illustrates an embodiment of a process for adjusting a vehicle seat onboard a vehicle, in accordance with the disclosed embodiments.

FIG. 3 is a flow chart that illustrates an embodiment of a process 300 for adjusting a vehicle seat onboard a vehicle, in accordance with the disclosed embodiments. First, the process 300 obtains vehicle status data, by a processor communicatively coupled to a plurality of sensors onboard the vehicle (step 302). Vehicle status data may include any data obtained from internal vehicle sensors and external vehicle sensors configured to obtain current vehicle status data associated with various components and systems of the vehicle. Vehicle status data obtained via internal vehicle sensors may include: a current seat position, a current seat orientation, presence of a passenger in the vehicle seat, a weight of the passenger in the vehicle seat, vehicle onboard airbag deployment status data, vehicle mass data, system power data, or the like. Vehicle status data obtained via external vehicle sensors may include: parallel park assist sensor data, front radar data, side blind radar data, wheel alignment data, vehicle acceleration data, vehicle heading data, and vehicle speed data.

Next, the process 300 detects a current actuation state of the vehicle seat based on the vehicle status data, by the processor, wherein the current actuation state comprises at least one of a user input actuation state and an emergency actuation state (step 304). Suitable methodologies for detecting a current actuation state of the vehicle seat are described below with reference to FIGS. 4 and 5. The process 300 detects a user input actuation state when a user input request for seat actuation is received, wherein the user input request includes desired seat position and seat orientation parameters. The process 300 detects an emergency actuation state when an emergency event is detected by vehicle onboard sensors, including collision sensors, airbag deployment sensors, or the like.

The process 300 then calculates seat adjustments, by the processor, based on the current actuation state (step 306). One suitable methodology for calculating the seat adjustments is described below with reference to FIG. 6. During regular use, the process 300 receives user input through traditional controls (e.g., user adjustments to the seat for comfort and accessibility). However, during emergency situations the seat actuates automatically, as appropriate for the accident type. Depending on the situation, the seat actuates according to a preprogrammed and calibrated routine that is determined empirically and scientifically during vehicle development.

In certain embodiments, the process 300 unlocks a locking mechanism of an electromagnetic vehicle seat rail device coupled to the vehicle seat and communicatively coupled to the processor (step 308). The process 300 may unlock the locking mechanism in response to a detected emergency situation requiring adjustment of the vehicle seat and/or in response to a user input adjustment to the vehicle seat.

After unlocking the locking mechanism (step 308), the process 300 actuates the vehicle seat based on the seat adjustments, via the electromagnetic vehicle seat rail device (step 310). Here, the process 300 physically moves and adjusts the vehicle seat according to the calculated seat position and seat orientation. After actuating the vehicle seat (step 310), the process 300 locks the locking mechanism of the electromagnetic vehicle seat rail device to secure the vehicle seat (step 312).

Figure 4:
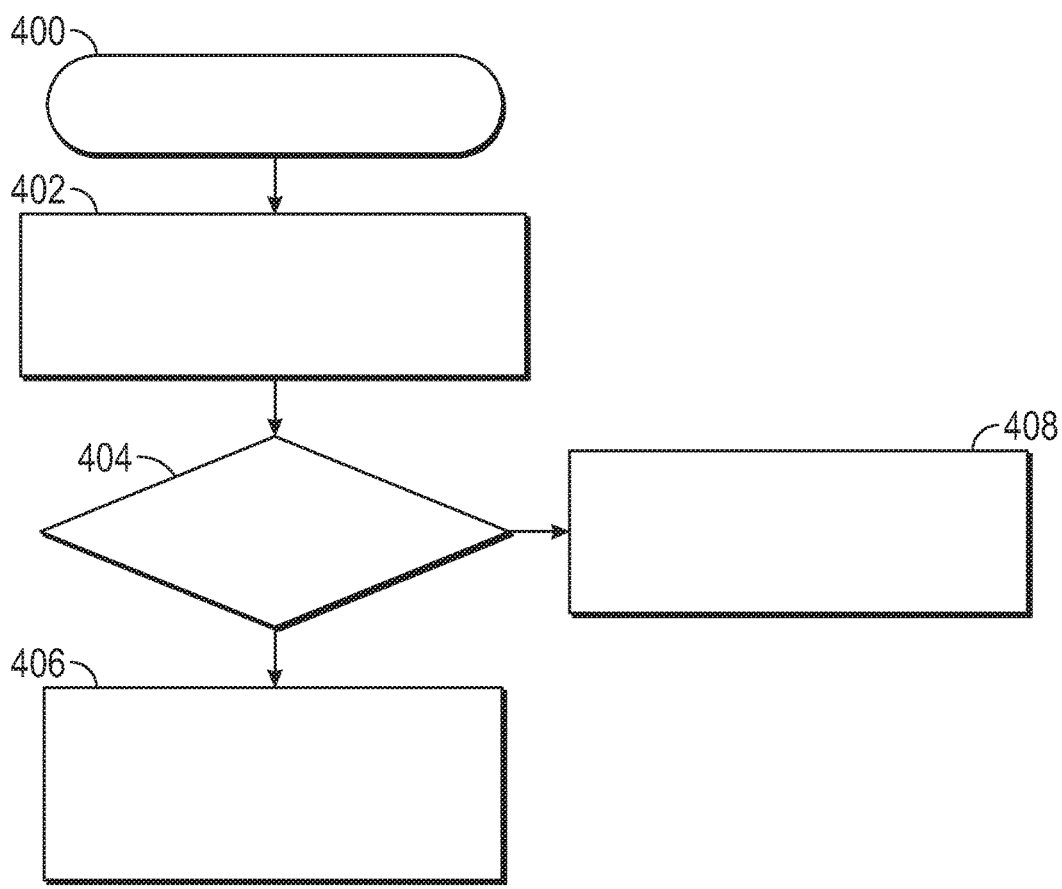
FIG. 4 is a flow chart that illustrates an embodiment of a process for detecting a current actuation state, in accordance with the disclosed embodiments.

FIG. 4 is a flow chart that illustrates an embodiment of a process 400 for detecting a current actuation state, in accordance with the disclosed embodiments. It should be appreciated that the process 400 described in FIG. 4 represents one embodiment of step 304 described above in the discussion of FIG. 3, including additional detail. First, the process 400 evaluates obtained vehicle status data to identify any potential vehicle threats (step 402). As described previously with regard to FIG. 3, the process 400 obtains vehicle status data comprising external vehicle sensor data, parallel park assist sensor data, front radar data, side blind radar data, wheel alignment data, vehicle acceleration data, vehicle heading data, and vehicle speed data. Potential vehicle threats may include potential collisions, currently occurring collisions, and other emergency situations. Additionally, the process 400 may detect potential vehicle threats indicated by a currently deployed airbag inside the vehicle.

When a potential vehicle threat has not been identified (the "No" branch of 404), then the process 400 determines that the current actuation state does not comprise an emergency actuation state (step 406). Generally, the process 400 evaluates vehicle status data continuously, and continues to detect vehicle status data and perform vehicle seat actuation calculations during operation of the vehicle. However, actuation of a vehicle seat does not occur unless a user input request for actuation is received via a user interface onboard the vehicle, or when an emergency actuation state has been detected by the process 400. Thus, when a potential vehicle threat has been identified (the "Yes" branch of 404), then the process 400 determines that the current actuation state comprises an emergency actuation state (step 408), and actuation of the vehicle seat occurs, as described previously with regard to FIG. 3.

Figure 5:
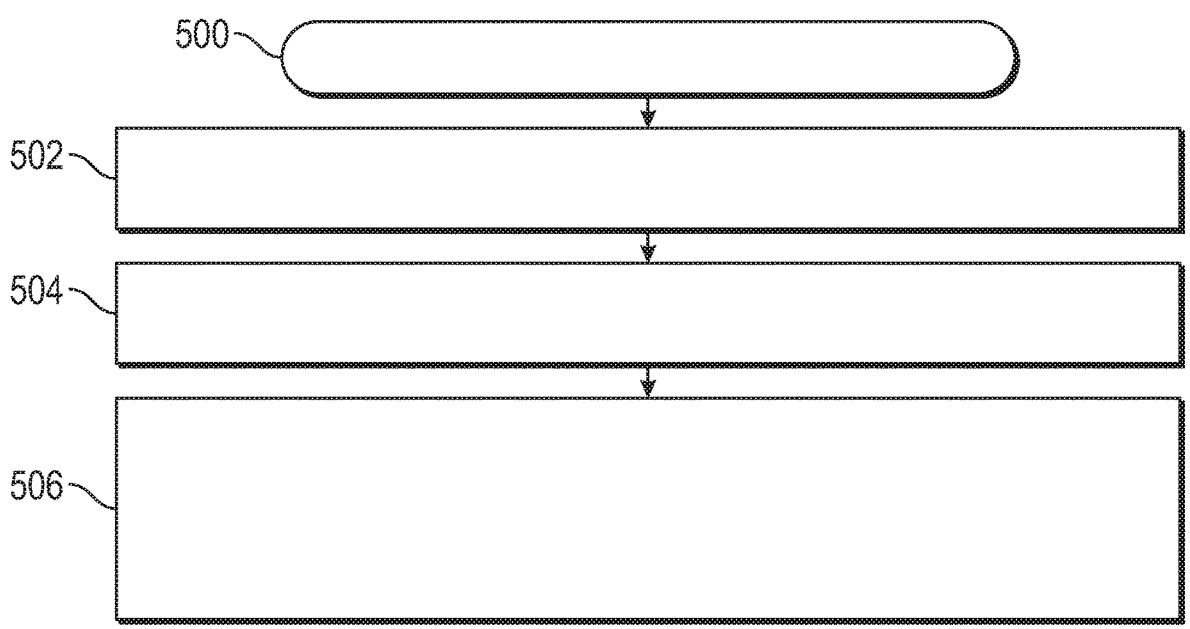
FIG. 5 is a flow chart that illustrates a second embodiment of a process for detecting a current actuation state, in accordance with the disclosed embodiments.

FIG. 5 is a flow chart that illustrates a second embodiment of a process 500 for detecting a current actuation state, in accordance with the disclosed embodiments. It should be appreciated that the process 500 described in FIG. 5 represents one embodiment of step 304 described above in the discussion of FIG. 3, including additional detail. The process 500 receives a user input request for adjustment of the vehicle seat, via a user interface communicatively coupled to the processor (step 502). The user may request adjustment of the vehicle seat for user comfort inside the vehicle.

The process 500 then evaluates the user input request to identify a potential vehicle seat position and a potential vehicle seat orientation (step 504) and, when a potential vehicle seat position and a potential vehicle seat orientation are included in the received user request, the process 500 then determines that the user input request comprises a request for adjustment of the vehicle seat based on the identification of the potential vehicle seat position and the potential vehicle seat orientation, wherein the user input actuation state comprises the request for adjustment (step 506). Using the electromagnetic rails, the process 500 performs basic translation of the seat forwards and backwards. Further actuation may include reclining forwards and backwards, and tilting of the entire seat or head forwards and backwards or from side to side. Additionally, the process 500 may fully rotate the seat three hundred and sixty (360) degrees.

Figure 6:
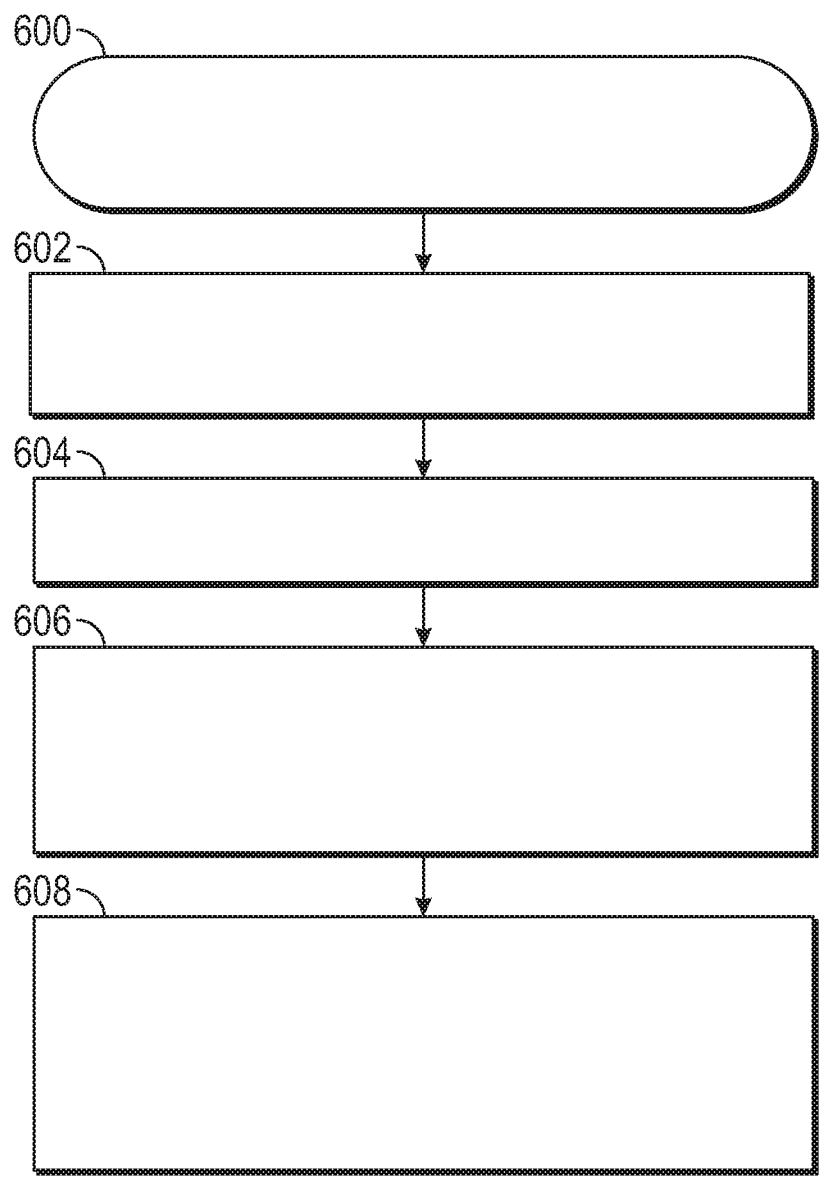
FIG. 6 is a flow chart that illustrates an embodiment of a process for calculating vehicle seat adjustments based on the current actuation state, in accordance with the disclosed embodiments.

FIG. 6 is a flow chart that illustrates an embodiment of a process 600 for calculating vehicle seat adjustments based on the current actuation state, in accordance with the disclosed embodiments. It should be appreciated that the process 600 described in FIG. 6 represents one embodiment of step 306 described above in the discussion of FIG. 3, including additional detail. First, the process 600 obtains vehicle status data including a current seat position and a current seat orientation (step 602). In certain embodiments, the process 600 measures the current position and orientation of the vehicle seat by recording the differences in current or magnetic field as the seat actuates with respect to the rail. In other embodiments, the process 600 uses encoders to obtain the current position and orientation of the vehicle seat.

Next, the process 600 determines a potential seat position and a potential seat orientation (step 604). In some embodiments, the potential seat position and orientation are defined by a user input request for adjustment of the vehicle seat. In this scenario, the user enters specific parameters for the potential seat position and orientation. In some embodiments, the potential seat position and orientation are calculated by the process 600, based on a detected emergency situation onboard the vehicle. Parameters indicating an emergency situation may be derived from onboard sensors in real-time, or pre-programmed into a vehicle onboard computer system with results gathered from testing and simulation.

The process 600 then calculates a time duration for actuating the vehicle seat from the current seat position and the current seat orientation to the potential seat position and the potential seat orientation (step 606). The process 600 also calculates power requirements for actuating the vehicle seat from the current seat position and the current seat orientation to the potential seat position and the potential seat orientation (step 608). Powering the electromagnetic vehicle seat rail devices generates electromagnetic forces causing seat actuation along track rails. Here, the process 600 calculates a quantity of required power to actuate (i.e., move) the vehicle seat from a current position and orientation to the potential seat position and orientation. The process 600 also calculates the amount of time required, when the electromagnetic vehicle seat rail devices are powered using the quantity of required power, to actuate the vehicle seat from a current position and orientation to the potential seat position and orientation. Thus, the process 600 calculates timing requirements and power requirements for actuating the vehicle seat, using an electromagnetic vehicle seat rail device.

The various tasks performed in connection with processes 300-600 may be performed by software, hardware, firmware, or any combination thereof. For illustrative purposes, the preceding descriptions of processes 300-600 may refer to elements mentioned above in connection with FIGS. 1-2. In practice, portions of processes 300-600 may be performed by different elements of the described system. It should be appreciated that processes 300-600 may include any number of additional or alternative tasks, the tasks shown in FIGS. 3-6 need not be performed in the illustrated order, and processes 300-600 may be incorporated into a more comprehensive procedure or process having additional functionality not described in detail herein. Moreover, one or more of the tasks shown in FIGS. 3-6 could be omitted from embodiments of processes 300-600 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for adjusting a vehicle seat onboard a vehicle, the method comprising:
    obtaining vehicle status data, by a processor communicatively coupled to a plurality of sensors onboard the vehicle, wherein obtaining the vehicle status data further comprises detecting a current seat position and a current seat orientation;
    detecting a current actuation state of the vehicle seat based on the vehicle status data, by the processor, wherein the current actuation state comprises at least one of a user input actuation state and an emergency actuation state;
        calculating seat adjustments, by the processor, based on the current actuation state, wherein calculating the seat adjustments further comprises:
        determining a potential seat position and a potential seat orientation;
        calculating a time duration for actuating the vehicle seat from the current seat position and the current seat orientation to the potential seat position and the potential seat orientation; and
        calculating power requirements for actuating the vehicle seat from the current seat position and the current seat orientation to the potential seat position and the potential seat orientation; and
    actuating the vehicle seat based on the seat adjustments and using the power requirements and the time duration, via an electromagnetic vehicle seat rail device communicatively coupled to the processor.

2. The method of claim 1, further comprising:
    unlocking a locking mechanism of the electromagnetic vehicle seat rail device, via a power source communicatively coupled to the processor;
    actuating the vehicle seat after unlocking the locking mechanism; and
    locking the locking mechanism of the electromagnetic vehicle seat rail device to secure the vehicle seat after actuating.

3. The method of claim 1, wherein obtaining the vehicle status data further comprises detecting first vehicle data comprising internal vehicle sensor data, a passenger weight, vehicle mass data, and system power data; and
    wherein the method further comprises calculating the time duration and the power requirements based on the first vehicle data.

4. The method of claim 1, wherein obtaining the vehicle status data further comprises detecting second vehicle data comprising external vehicle sensor data, parallel park assist sensor data, front radar data, side blind radar data, wheel alignment data, vehicle acceleration data, vehicle heading data, vehicle speed data, laser-based vision system data, visible light based vision system data, and rear threat detection system data; and
    wherein the method further comprises:
        identifying a potential vehicle threat, using the second vehicle data; and
        when the potential vehicle threat is identified, determining that the current actuation state comprises an emergency actuation state.

5. The method of claim 4, further comprising:
    wherein obtaining the vehicle status data further comprises detecting third vehicle data comprising presence of a passenger in the vehicle seat, a weight of the passenger in the vehicle seat, a current vehicle seat position, and a current vehicle seat orientation;
    wherein the method further comprises computing an emergency vehicle seat position and an emergency vehicle seat orientation; and
    wherein the vehicle seat is actuated based on the emergency vehicle seat position and the emergency vehicle seat orientation.

6. The method of claim 1, wherein obtaining the vehicle status data further comprises detecting whether a vehicle onboard airbag is currently deployed; and
    wherein, when the vehicle onboard airbag is currently deployed, the method further comprises:
        identifying a potential vehicle threat, based on the vehicle onboard airbag currently being deployed; and
        when the potential vehicle threat is identified, determining that the current actuation state comprises an emergency actuation state.

7. The method of claim 1, further comprising:
    receiving user input request for adjustment of the vehicle seat, via a user interface communicatively coupled to the processor;
    evaluating the user input request to identify a potential vehicle seat position and a potential vehicle seat orientation, wherein the user input actuation state comprises the potential vehicle seat position and the potential vehicle seat orientation;
    calculating the seat adjustments, based on the potential vehicle seat position and the potential vehicle seat orientation.

8. A system for adjusting a vehicle seat onboard a vehicle, the system comprising:
    system memory;
    a plurality of sensors onboard the vehicle, the plurality of sensors comprising internal vehicle sensors and external vehicle sensors;
    an electromagnetic vehicle seat rail device, comprising locking mechanisms, friction surfaces, and electromagnetic rail elements, wherein the electromagnetic rail elements comprise permanent magnets positioned on one of a seat rod and seat adjustment tracks, and electromagnets positioned on a second one of the seat rod and the seat adjustment tracks, wherein the permanent magnets and the electromagnets are configured to actuate the vehicle seat based on an electromagnetic field generated by toggling current, wherein as the permanent magnets travel forward, the electromagnets toggle the electromagnetic field such that the electromagnets alternate between pulling the permanent magnets from a front of the vehicle seat to pushing the permanent magnets from a back of the vehicle seat;
a power source configured to generate electromagnetic forces that cause seat actuation along track rails; and
at least one processor communicatively coupled to the system memory, the plurality of vehicle sensors, the electromagnetic vehicle seat rail device, and the power source, the at least one processor configured to:
obtain vehicle status data, via the plurality of sensors onboard the vehicle;
detect a current actuation state of the vehicle seat based on the vehicle status data, wherein the current actuation state comprises at least one of a user input actuation state and an emergency actuation state;
calculate seat adjustments, based on the current actuation state; and
actuating the vehicle seat based on the seat adjustments, via the electromagnetic vehicle seat rail device.

9. The system of claim 8, wherein the electromagnetic rail elements comprise electromagnetic coils positioned in a seat rod and seat adjustment tracks; and
wherein the electromagnetic coils are configured to receive an electric current generating an electromagnetic field that magnetically actuates the vehicle seat, wherein an electric current direction determines an electromagnetic field direction.

10. The system of claim 8, wherein the friction surfaces of the electromagnetic vehicle seat rail device comprise rail slide guide positioned on electromagnetic vehicle seat rail device; and
wherein the rail slide guide is configured to provide a smooth motion path for the vehicle seat during actuation using the electromagnetic vehicle seat rail device.

11. The system of claim 8, wherein the friction surfaces of the electromagnetic vehicle seat rail device comprise seat rail rollers positioned inside a seat rail roller groove of a seat rail channel; and
wherein the seat rail rollers are configured to provide smooth motion for the vehicle seat during actuation using the electromagnetic vehicle seat rail device.

12. The system of claim 8, wherein the locking mechanisms comprise at least one seat position lock port and a seat lock actuator;
wherein the at least one seat position lock port and the seat lock actuator are configured to prevent actuation of the vehicle seat by securing the vehicle seat in place in the absence of user seat adjustment commands and during power failure; and
wherein the at least one processor is further configured to:
unlock the locking mechanisms of the electromagnetic vehicle seat rail device, via the power source;
actuate the vehicle seat after unlocking the locking mechanism; and
lock the locking mechanisms of the electromagnetic vehicle seat rail device to secure the vehicle seat after actuating.

13. The system of claim 8, wherein the at least one processor is further configured to obtain the vehicle status data by detecting a current seat position and a current seat orientation;
wherein the at least one processor is further configured to calculate the seat adjustments by:
determining a potential seat position and a potential seat orientation;
calculating a time duration for actuating the vehicle seat from the current seat position and the current seat orientation to the potential seat position and the potential seat orientation; and
calculating power requirements for actuating the vehicle seat from the current seat position and the current seat orientation to the potential seat position and the potential seat orientation; and
wherein the at least one processor is further configured to actuate the vehicle seat using the power requirements and the time duration.

14. The system of claim 13, wherein the at least one processor is further configured to obtain the vehicle status data by detecting first vehicle data comprising internal vehicle sensor data, a passenger weight, vehicle mass data, and system power data; and
wherein the at least one processor is further configured to calculate the time duration and the power requirements based on the first vehicle data.

15. The system of claim 8, wherein the at least one processor is further configured to obtain the vehicle status data by detecting second vehicle data comprising external vehicle sensor data, parallel park assist sensor data, front radar data, side blind radar data, wheel alignment data, vehicle acceleration data, vehicle heading data, vehicle speed data, laser-based vision system data, visible light based vision system data, and rear threat detection system data; and
wherein the at least one processor is further configured to:
identify a potential vehicle threat, using the second vehicle data; and
when the potential vehicle threat is identified, determine that the current actuation state comprises an emergency actuation state.

16. The system of claim 15, wherein the at least one processor is further configured to obtain the vehicle status data by detecting third vehicle data comprising presence of a passenger in the vehicle seat, a weight of the passenger in the vehicle seat, a current vehicle seat position, and a current vehicle seat orientation;
wherein the at least one processor is further configured to compute an emergency vehicle seat position and an emergency vehicle seat orientation; and
wherein the at least one processor is further configured to actuate the vehicle seat based on the emergency vehicle seat position and the emergency vehicle seat orientation.

17. The system of claim 8, wherein the at least one processor is further configured to obtain the vehicle status data by detecting whether a vehicle onboard airbag is currently deployed; and
wherein, when the vehicle onboard airbag is currently deployed, the at least one processor is further configured to:
identify a potential vehicle threat, based on the vehicle onboard airbag currently being deployed; and
when the potential vehicle threat is identified, determine that the current actuation state comprises an emergency actuation state.

18. A system for adjusting a vehicle seat onboard a vehicle, the system comprising:
- system memory;
- a plurality of sensors onboard the vehicle, the plurality of sensors comprising internal vehicle sensors and external vehicle sensors;
- an electromagnetic vehicle seat rail device, comprising locking mechanisms, friction surfaces, and electromagnetic rail elements;
- a power source configured to generate electromagnetic forces that cause seat actuation along track rails;
- at least one processor communicatively coupled to the system memory, the plurality of vehicle sensors, the electromagnetic vehicle seat rail device, and the power source, the at least one processor configured to:
  - obtain vehicle status data, via the plurality of sensors onboard the vehicle;
  - detect a current actuation state of the vehicle seat based on the vehicle status data, wherein the current actuation state comprises at least one of a user input actuation state and an emergency actuation state;
  - calculate seat adjustments, based on the current actuation state; and
  - actuating the vehicle seat based on the seat adjustments, via the electromagnetic vehicle seat rail device; and
- a back-up power source communicatively coupled to the at least one processor, wherein the back-up power source is configured to:
- maintain a charged status for back-up use by the processor and the electromagnetic vehicle seat rail device to perform actuation of the vehicle seat;
- provide power to the electromagnetic vehicle seat rail device during failure of the power source; and
- provide burst power for rapid adjustment during a crash event or airbag deployment.

* * * * *